E. Deming
Harness Trimming.
Nº 68,559. Patented Sep 3, 1867.

Witnesses;
A. J. Tibbits
J. H. Shumway

Inventor;
Ernest Deming

By his Attorney
John E. Earle

United States Patent Office.

ERNEST DEMING, OF MIDDLETOWN, CONNECTICUT.

Letters Patent No. 68,559, dated September 3, 1867.

IMPROVED CHECK-HOOK.

*The Schedule referred to in these Letters Patent and making part of the same.*

TO ALL WHOM IT MAY CONCERN:

Be it known that I, ERNEST DEMING, of Middletown, in the county of Middlesex, and State of Connecticut, have invented a new improvement in Harness-Check-Hook; and I do hereby declare the following, when taken in connection with the accompanying drawings, and the letters of reference marked thereon, to be a full, clear, and exact description of the same, and which said drawings constitute part of this specification, and represent, in—

Figure 1:
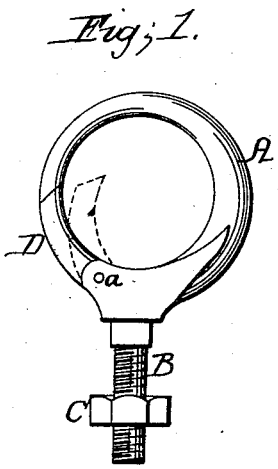

Figure 1, a side view, and in

Figure 2:
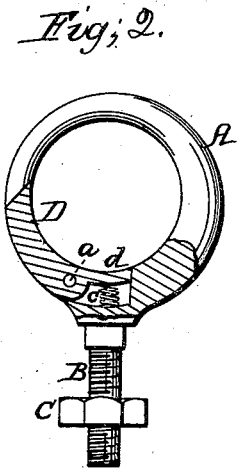

Figure 2 a sectional view.

This invention relates to an improvement in the hook upon a harness employed for securing the check-rein, and consists in combining with the ordinary check-hook a spring tongue, which will prevent the accidental disengaging of the check-rein.

To enable others to construct my improvement, I will proceed to describe the same as illustrated in the accompanying drawings.

A is the hook, fixed to a screw-shank, B, and provided with a nut, C, for securing the hook to the harness. D is a tongue, hinged at $a$, and with a lip, $d$, projecting back, and beneath which is arranged a spring, $c$, as seen in fig. 2. The tendency of the said spring is to hold the tongue D in a closed position, as denoted in figs. 1 and 2, and yet so as to allow the tongue D to be turned inward, as denoted in red, fig. 1, to allow the rein to be introduced into the hook, or disengaged therefrom, as the case may be. The lip $d$ closes the recess in the hook to prevent the entrance of any substance to interfere with the free action of the spring.

I do not broadly claim the hook constructed with a spring tongue so as to close the tongue, as such are common, and well known to the trade as snap-hooks.

Having thus fully described my invention, what I claim as new and useful, and desire to secure by Letters Patent, is—

The check-hook A, formed with a screw-shank, B, and nut, C, and combined with a tongue, D, substantially as described, as an improved article of manufacture.

ERNEST DEMING.

Witnesses:
JOHN E. EARLE,
A. J. TIBBITS.